United States Patent [19]

Gill

[11] 4,054,108
[45] Oct. 18, 1977

[54] INTERNAL COMBUSTION ENGINE

[75] Inventor: Lloyd T. Gill, Okemos, Mich.

[73] Assignee: General Motors Corporation, Detroit, Mich.

[21] Appl. No.: 710,923

[22] Filed: Aug. 2, 1976

[51] Int. Cl.$^2$ ............................................. F02B 75/22
[52] U.S. Cl. ............................ 123/55 R; 123/139 BC; 123/139 AL; 123/195 A; 123/55 VE; 123/198 C
[58] Field of Search ............... 123/139 BC, 139 AL, 123/195 A, 55 R, 55 VF, 55 VS, 55 VE, 55 V, 55 SR, 198 C

[56] References Cited

U.S. PATENT DOCUMENTS

| | | | |
|---|---|---|---|
| 2,143,935 | 1/1939 | Chandler | 123/195 A |
| 2,429,105 | 10/1947 | Paxman | 123/55 V |
| 2,793,625 | 5/1957 | Kolbe | 123/55 VE |
| 2,875,739 | 3/1959 | Marchand | 123/55 R |
| 2,882,884 | 4/1959 | Scheiterlein | 123/55 VS |
| 2,890,690 | 6/1959 | Dolza | 123/139 AL |
| 2,946,576 | 7/1960 | Coulter | 123/139 BC |
| 3,709,200 | 1/1973 | Reisacher | 123/55 UE |

FOREIGN PATENT DOCUMENTS 735,301  5/1943  Germany ..................... 123/195 A Primary Examiner—Wendell E. Burns
Attorney, Agent, or Firm—Robert J. Outland

[57] ABSTRACT

A V-type automotive diesel engine having a high pressure fuel injection pump mounted between the cylinder heads and intake manifolds and above a tappet gallery cover that is integral with the intake manifolds. The pump is supported on the cylinder block by an extension through the gallery cover and the pump drive angles downwardly through the support to a compact bevel drive gear connection with the engine camshaft. The manifold and cover member includes a water crossover connection between the cylinder heads, and the intake manifolds in the cover are interconnected by a distribution fitting that extends over the injection pump and supports an air cleaner. The arrangement provides a compact engine construction capable of being interchanged in a vehicle with gasoline engines of similar general arrangement and piston displacement.

5 Claims, 3 Drawing Figures

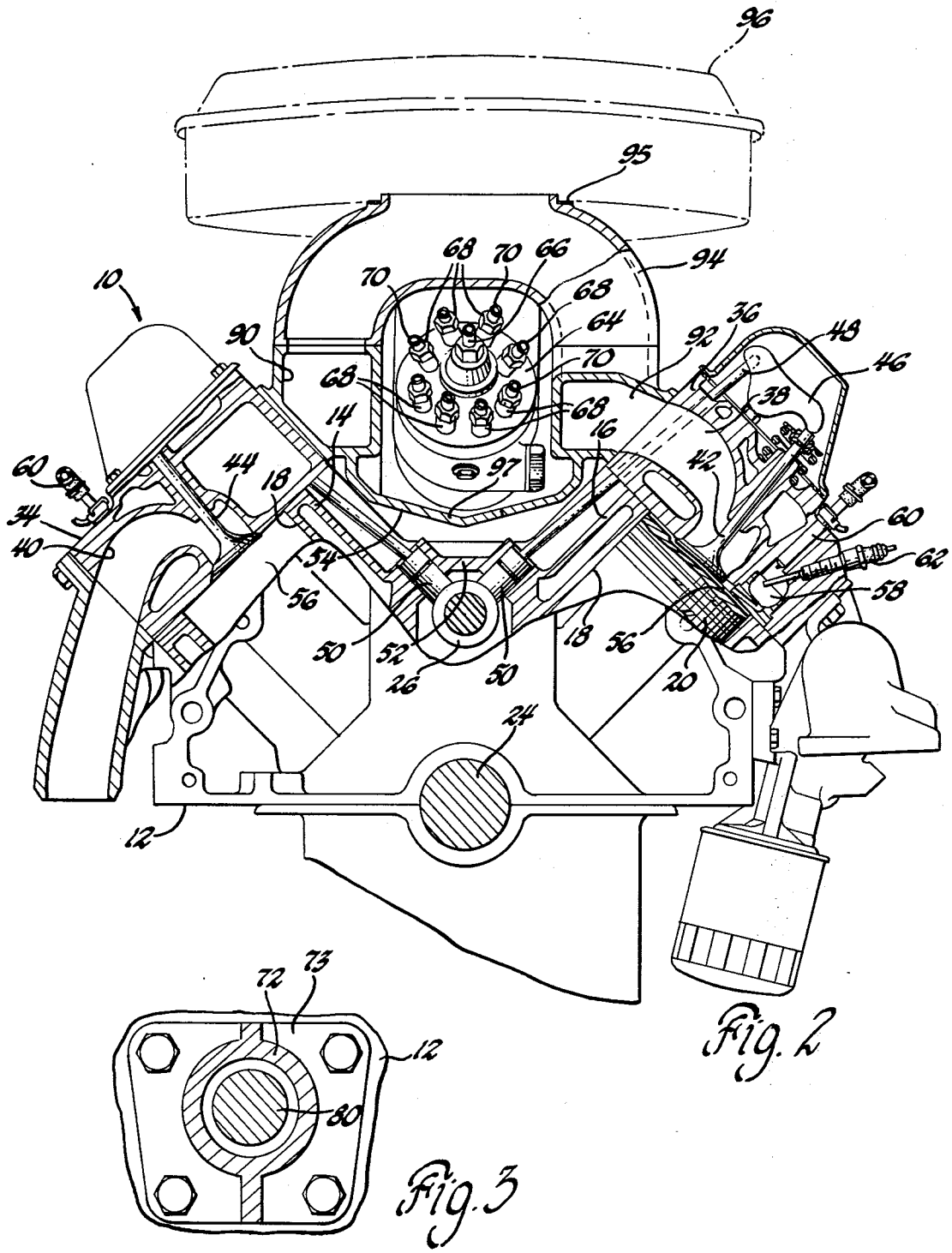

INTERNAL COMBUSTION ENGINE

This invention relates to internal combustion engines provided with high pressure fuel injection systems. More particularly, the invention relates to an arrangement for a V-type automotive diesel engine provided with a high pressure fuel injection system supplied by an engine driven pump.

It is known in the art relating to V-type automotive diesel engines to provide a high pressure fuel injection pump mounted in the V between the cylinder heads and driven through gears, or the like, from the engine camshaft or crankshaft. In such arrangements, the driveshaft of the injection pump is commonly mounted parallel to the camshaft and connected to it by a pair of relatively large drive gears. These gears occupy a significant amount of space at one end of the engine, thus requiring the location elsewhere of other engine components that might advantageously be located in the space occupied by the drive system.

The present invention provides a compact fuel injection pump mounting and drive arrangement for a V-type automotive engine, particularly a diesel engine, which permits mounting the fuel injection pump in the V between the cylinder heads but avoids the use of large pump drive gears. The invention further provides a removable tappet gallery cover integrated with the engine intake manifolds, with the pump being located above the cover and between the manifolds while being mounted solidly on the engine block by an extension through the tappet gallery cover. The space above the pump drive is utilized to provide a water crossover and thermostat housing integrated into the manifold and gallery cover member and located between the cylinder heads. A removable air distribution fitting extending over the injection pump interconnects the air intake manifolds and supports a centrally located air cleaner.

The arrangement provides a compact fuel injection pump drive and mounting arrangement for an automotive type engine, particularly a diesel engine, as well as an efficient arrangement of the various engine components surrounding the injection pump which permits the engine to be installed in a space similar to that required for a comparably sized gasoline engine of similar general arrangement. These and other features and advantages of the invention will be more fully understood from the following description of a preferred embodiment taken together with the accompanying drawings.

In the drawings:

FIG. 2 is a rear end view, partially in section, of the engine of FIG. 1; and

FIG. 3 is a fragmentary cross-sectional view from the plane indicated by the line 3—3 of FIG. 1 and showing details of the mounting arrangement for the removable pump mounting member.

Figure 1:
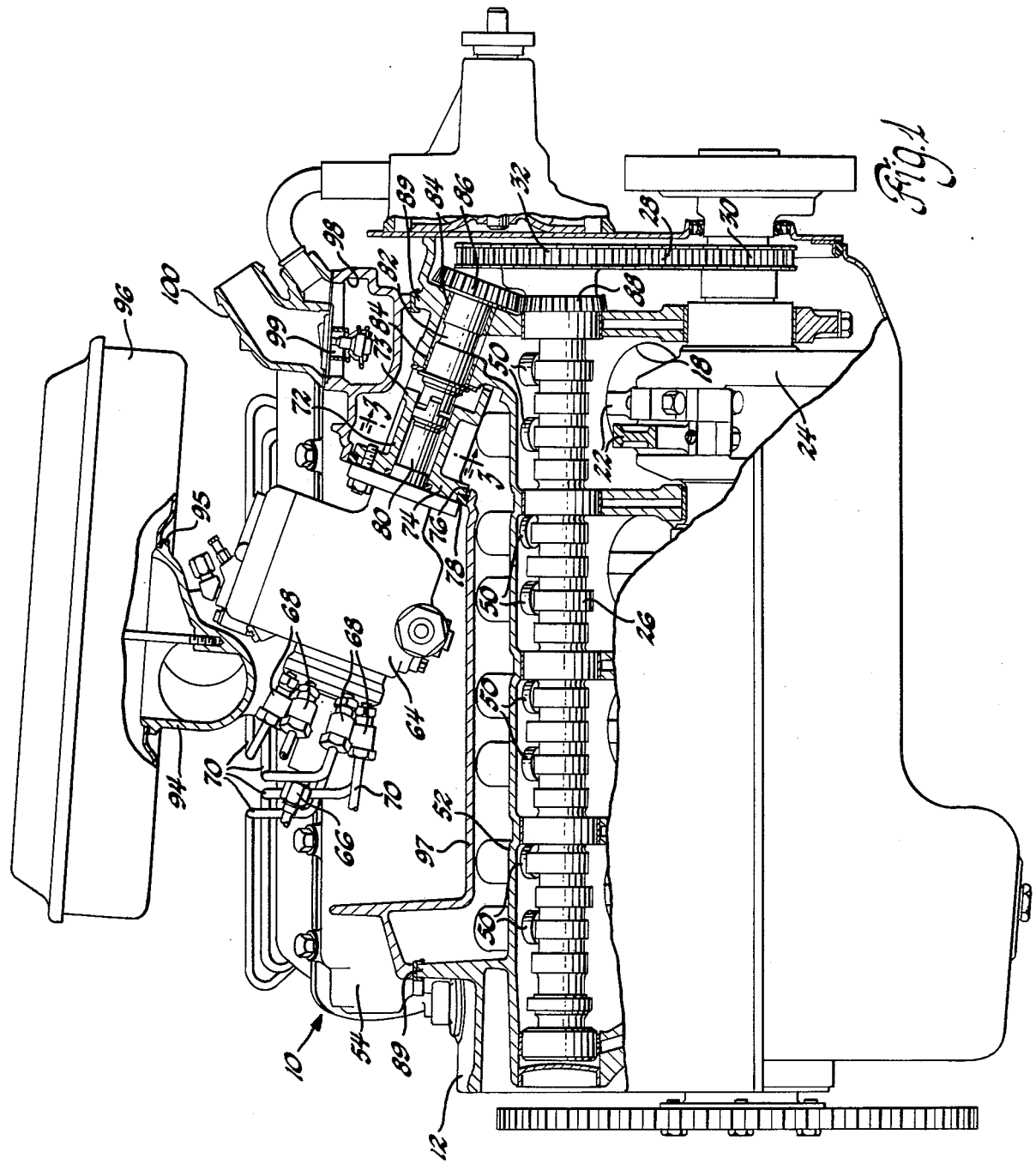
FIG. 1 is a side view, partially in cross section, of a V-type diesel internal combustion engine arranged in accordance with the invention.

Referring now to the drawings in detail, there is shown a V-type automotive diesel internal combustion engine generally indicated by numeral 10. Engine 10 includes a cylinder block 12 having two banks 14, 16 of longitudinally aligned cylinders 18 arranged in a V configuration. Pistons 20 are reciprocably disposed in the cylinders and are connected through connecting rods 22 with the crankshaft 24 rotatably supported in the cylinder block in conventional manner.

Immediately above the crankshaft, a camshaft 26 is rotatably supported longitudinally of the block and on an axis parallel with the axis of the crankshaft. The camshaft is driven through a chain 28 connected with a drive sprocket 30 on the front of the crankshaft and a driven sprocket 32 on the front of the camshaft and is arranged to operate the engine valve gear to be subsequently described.

Mounted on the ends of the cylinder banks and closing the ends of the cylinders are cylinder heads 34, 36. The cylinder heads provide intake and exhaust ports 38, 40 respectively for each cylinder and carry intake and exhaust poppet valves 42, 44, respectively for controlling the passage of gases between their respective ports and cylinders. The valves are actuated by appropriate valve gear including rocker arms 46, push rods 48 and hydraulic valve lifters or tappets 50 which engage the cams of the camshaft 26 for actuation in timed relation with the operation of the engine.

The tappets 50 are supported in a lifter gallery 52, which comprises a portion of the block extending longitudinally over the camshaft near the bottom of the interior of the V formed by the cylinder banks. The open portion of the V containing the camshaft, lifter gallery and part of the valve gear is closed by an integral cover and inlet manifold member 54 to be subsequently more fully described.

In closing the cylinder ends, the cylinder heads 34, 36, together with the cylinders and their respective pistons, define main combustion chambers 56 at the cylinder outer ends. Adjacent these chambers and outward of the intake and the exhaust ports, precombustion chambers 58 are formed in the cylinder heads connecting with the main chambers 56. Each of the precombustion chambers is provided with a fuel injection nozzle 60 for spraying fuel into its respective precombustion chamber and a glow plug 62 to aid in ignition of the fuel.

In addition to the injection nozzles 60, the engine fuel system includes an engine driven high pressure injection pump 64 mounted on the top of the engine between the cylinder banks and cylinder heads. Pump 64 has an inlet fitting 66 through which fuel is supplied from an external source and a plurality of high pressure outlet fittings 68, each of which is connected through a high pressure line 70 with the injection nozzle 60 for one of the cylinders. In accordance with conventional practice, the lines are formed of approximately equal lengths in order to balance fuel distribution between the cylinders.

The pump 64 is mounted on a tubular support member 72 having a lower mounting flange 73 and is bolted directly to the cylinder block, as shown in FIG. 3. The pump is in turn bolted to an upper mounting flange 74 of the support member 72 which extends through an opening 76 in the cover and manifold member 54, the clearance being closed by a peripheral seal 78.

The pump is oriented on the support member 72 so that its drive shaft 80 extends downwardly at an angle through the center of the tubular support member on an axis which lies in the same plane as the axes of the camshaft and crankshaft of the engine and which closely approaches the camshaft axis at a point near the end of the camshaft. The pump drive shaft is drivably engaged with a stub shaft 82 rotatably supported on bearings 84 in the engine block 12 for rotation on the same axis as the pump driveshaft. At the end opposite the pump, the stub shaft has a small bevel gear 86 that is engaged with and driven by an associated bevel drive gear 88 formed near the front of the camshaft, adjacent the sprocket.

The arrangement is such that the pump drive, including its associated driven and drive gears 86, 88, occupies a minimum of space toward the front of the engine and in the enclosed portions of the block for ease of lubrication, while permitting the main body of the pump to be disposed between the cylinder banks and heads and above the cover member 54 where fuel line connections are easily reached and inspected. The arrangement also provides for mounting of the pump on the block, rather than on the cover, the support member 72 being made separate from the block solely for manufacturing convenience, since this member extends above the upper rail 89 of the block on which the cover is seated and which is used as a manufacturing support for some machining operations. Thus, if desired, it would be possible to form the support member 72, or an equivalent construction, as an integral part of the cylinder block.

As previously indicated, the cover member 54 is formed integral with the air inlet manifolds which define separate longitudinally extending chambers 90, 92 extending along and secured to the inner sides of their respective cylinder heads 34, 36 for the purpose of distributing air to their respective inlet ports 38. The air chambers are interconnected by a separate distribution fitting 94 that mounts centrally on the manifold portions of the member 54 and is provided with a central upper mounting flange 95 on which an air cleaner 96 is mounted. The distribution fitting extends over the outlet portion of the pump 64 which is located between the manifold portions of the member 54 but above the lower cover portion 97 that extends between the manifold chamber defining portions.

At the front end of the engine, the cover member 54 extends upwardly, covering the pump drive and forming at the front edge thereof a transverse water crossover passage 98 on which are mounted a thermostat 99 and water outlet housing 100. This construction is somewhat similar to that used in some gasoline powered vehicle engines of similar size in which a water crossover passage is formed integral with the intake manifold.

The provision of a conventionally arranged water crossover passage in the present construction is made possible by the use of the compact downwardly angled pump drive which takes up a minimum of space within the engine block at the front end of the engine and permits the crossover passage to be integrated with the manifold cover member, much as if this member were a gasoline engine intake manifold. In similar fashion, the arrangement of the air manifolds beside the pump and the distribution fitting over the pump allows the air cleaner to be positioned relative to the engine in much the same location and manner as if it were mounted on the carburetor of a similar size gasoline engine. Thus, the package size of the V-type diesel engine arrangement disclosed, which is formed in accordance with the invention, is not greatly different than the corresponding dimensions of a similarly sized gasoline engine of similar character, and thus the two engines may be used interchangeably in similar vehicle engine compartments.

While the invention has been disclosed by reference to a specific preferred embodiment, it should be understood that numerous changes could be made within the scope of the inventive concepts disclosed. Accordingly, the invention is not intended to be limited by the disclosure, but rather to have the full scope permitted by the language of the following claims.

What is claimed is:

1. A V-type automotive engine comprising
   a cylinder block having a pair of angularly disposed cylinder banks defining longitudinally aligned cylinders,
   pistons in the cylinders,
   a crankshaft supported in the cylinder block at the junction of the cylinder banks and connected with the pistons to convert their reciprocating motion to rotational motion of the crankshaft,
   a camshaft carried in the block between the cylinder banks for rotation on an axis parallel with and spaced from the axis of the crankshaft, the camshaft being driven by the crankshaft in timed relation with the movement of the pistons,
   cylinder heads disposed on the ends of said cylinder banks and closing the ends of the cylinders, said cylinder heads including ports communicating with each cylinder and poppet valves movable to conrol the opening and closing of said ports,
   valve actuating means between the camshaft and the valves for actuating the valves in timed relation with the motion of the pistons,
   a cover member extending between the cylinder banks and covering the camshaft, and
   fuel injection means including an injection nozzle for each cylinder, said nozzles being mounted on the cylinder heads at their respective cylinder locations, a fuel injection pump mounted between the engine cylinder heads and above the cover member and fuel lines interconnecting the injection pump with the injection nozzles, said injection pump having a drive shaft angled downwardly for rotation on an axis coplanar with the axes of the camshaft and crankshaft and forming an acute angle with the camshaft axis, and
   pump drive means including a first bevel gear on one end of said camshaft and a second bevel gear engaging said first gear and supported in the block for rotation on an axis closely approaching the camshaft axis at said one end and coaxial with the pump drive shaft axis, said second gear being drivably connected with said pump drive shaft,
   whereby a compact internal drive and mounting arrangement is provided for said fuel injection pump.

2. A V-type automotive diesel engine comprising
   a cylinder block having a pair of angularly disposed cylinder banks defining longitudinally aligned cylinders,
   pistons in the cylinders,
   a crankshaft supported in the cylinder block at the junction of the cylinder banks and connected with the pistons to convert their reciprocating motion to rotational motion of the crankshaft,
   a camshaft carried in the block between the cylinder banks for rotation on an axis parallel with and spaced from the axis of the crankshaft, the camshaft being driven by the crankshaft in timed relation with the movement of the pistons,
   cylinder heads disposed on the ends of said cylinder banks and closing the ends of the cylinders, said cylinder heads including intake and exhaust ports communicating with each cylinder and poppet valves movable to control the opening and closing of said ports, valve actuating means between said camshaft and said valves for actuating the valves in timed relation with the motion of the pistons, said actuating means including tappets carried in tappet galleries disposed above the camshaft and between the cylinder banks, a cover member extending between the cylinder banks and covering the tappet galleries, and fuel injection means including an injection nozzle for each cylinder, said nozzles being mounted on said cylinder heads at their respective cylinder locations, a fuel injection pump mounted between the engine cylinder heads and above the tappet gallery cover and fuel lines interconnecting said injection pump with the injection nozzles, said injection pump having a drive shaft angled downwardly for rotation on an axis coplanar with the axes of the camshaft and crankshaft and forming an acute angle with the camshaft axis, pump drive means carried in said cylinder block and including a first bevel gear on one end of said camshaft and a second bevel gear engaging said first gear and supported for rotation in said block on an axis closely approaching the camshaft axis at said one end and coaxial with the pump drive shaft axis, said second gear being drivably connected with said pump drive shaft, and mounting means extending through said tappet gallery cover and forming an extension of said cylinder block, said pump being secured to said mounting means, whereby a compact internal drive and block mounting arrangement is provided for said fuel injection pump.

3. An engine in accordance with claim 2 and further including means defining a pair of intake manifold chambers extending longitudinally beside and secured to the inner sides of the cylinder heads, said fuel injection pump being mounted between said intake manifold defining means, and an air distribution fitting supported on said manifold defining means and interconnecting said chambers, said distribution fitting extending over said pump and providing a mounting flange for mounting an intake air cleaner.

4. An engine in accordance with claim 3 wherein said air intake manifold defining means are formed integral with said tappet gallery cover member.

5. An engine in accordance with claim 4 wherein said integral cover and intake manifold defining member further defines a transverse water crossover passage connecting with water passages in the two cylinder heads and providing means for mounting a temperature control thermostat and outlet fitting for discharge of the engine cooling water, said water crossover passage extending over the pump drive means carried in the engine cylinder block.

* * * * *